(12) United States Patent
Rose et al.

(10) Patent No.: US 9,109,084 B1
(45) Date of Patent: Aug. 18, 2015

(54) SYNTHESIS OF POLYEPOXY SUCCINIC ACID COMPOUNDS USING FREE RADICAL INITIATORS

(71) Applicant: Jacam Chemical Company 2013, LLC, Sterling, KS (US)

(72) Inventors: David Jay Rose, Lyons, KS (US); Gene H. Zaid, Sterling, KS (US); Thomas W. Burgoyne, Sterling, KS (US); Kim Brashear, Lyons, KS (US)

(73) Assignee: Jacam Chemical Company 2013, LLC, Sterling, KS (US)

( * ) Notice: Subject to any disclaimer, the term of this patent is extended or adjusted under 35 U.S.C. 154(b) by 0 days.

(21) Appl. No.: 14/489,866

(22) Filed: Sep. 18, 2014

(51) Int. Cl.
  *C08G 63/02* (2006.01)
  *C08G 65/22* (2006.01)
  *C08G 65/335* (2006.01)
  *C08G 64/00* (2006.01)

(52) U.S. Cl.
  CPC .......... *C08G 65/22* (2013.01); *C08G 65/3355* (2013.01)

(58) Field of Classification Search
  USPC ..................................... 422/13, 18
  See application file for complete search history.

(56) References Cited

U.S. PATENT DOCUMENTS 6,333,005 B1 * 12/2001 Nguyen .......... 422/13

* cited by examiner

*Primary Examiner* — Terressa Boykin
(74) *Attorney, Agent, or Firm* — Hovey Williams LLP

(57) ABSTRACT

Methods of synthesizing polymers including repeat units of the formula

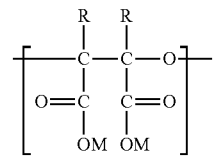

comprise the step of polymerizing repeat units of the formula

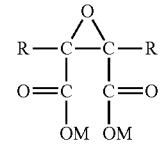

in the presence of a free radical catalyst, where each R and each M is separately and independently selected from the group consisting of H, C1-C12 straight or branched chain alkyl, aryl, amine, amide, and ester groups, halides, and mixtures thereof, and n ranges from about 2-15.

11 Claims, No Drawings

SYNTHESIS OF POLYEPOXY SUCCINIC ACID COMPOUNDS USING FREE RADICAL INITIATORS

BACKGROUND OF THE INVENTION

1. Field of the Invention

The present invention is broadly concerned with new methods of synthesis of polyepoxysuccinic acid (PESA), as well as derivatives and analogs thereof and copolymers including PESA moieties or repeat units. More particularly, the invention is concerned with such synthesis methods which completely eliminate the need for calcium-bearing compounds, thus allowing the synthesis without the need for costly and difficult removal of calcium.

2. Description of the Prior Art

In industrial cooling systems, water from rivers, lakes, or ponds is employed as cooling media for evaporative heat exchangers. Such natural waters contain large amounts of suspended materials, such as silt, clay, organic wastes, and dissolved salts (e.g., calcium and magnesium), and often, such contaminants can settle out as scale on the heat exchangers and related equipment, resulting in decreased efficiencies. In addition, during recovery and transfer of crude petroleum products, accompanying waters, sometimes even more contaminated than surface waters, can create severe scale and corrosion problems in well and transfer equipment.

PESA has been used in the past as an effective green corrosion and scale inhibitor, and also as dispersants for calcium carbonate, calcium sulfate, calcium fluoride, silica scale, and related compounds. PESA is traditionally prepared by polymerizing epoxysuccinic acid (ESA) with $Ca^{+2}$ ion, typically through the use of calcium hydroxide. Such synthesis techniques have been described in numerous patents, see, e.g., U.S. Pat. Nos. 4,065,475, 4,654,159, and 5,062,962. A drawback of these techniques is that the initial polymerized reaction product requires the removal of calcium via ion exchange resins, and only the homo-polymer PESA can be prepared. These purification steps significantly increase the costs associated with PESA production, and the homo-polymer limitation effectively excludes production of polymers including ESA repeat units with other repeat units such as acrylates.

There is accordingly a need in the art for improved PESA synthesis methods which eliminate the need for calcium ion, thereby reducing the production costs, while at the same time permitting co-polymerization with ESA and other repeat units.

SUMMARY OF THE INVENTION

The present invention is directed to a method of synthesizing PESA-type polymers including repeat units of the formula

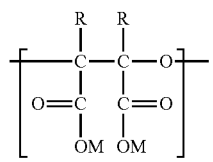

comprising the step of polymerizing compounds or repeat unit precursors of the formula

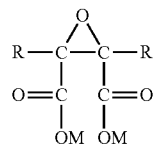

in the presence of a free radical catalyst, where each R and each M is separately and independently selected from the group consisting of H, C1-C12 straight or branched chain alkyl, aryl, amine, amide, and ester groups, halides, and mixtures thereof.

As used herein, "polymer" is an inclusive term and is intended to embrace monopolymers containing only a single repeat unit, copolymers containing different repeat units (e.g., copolymers, terpolymers, tetrapolymers, and higher order polymers). The synthesis methods of the invention are preferably carried out with essentially no calcium ion (i.e., less than about 2% by weight thereof), and more preferably to the complete exclusion of calcium ion, and using water and/or water soluble dispersants or solvents as a part of the reaction mixtures; the methods may also be carried out using emulsion polymerization techniques.

In its simplest form, the method involves the efficient and low-cost synthesis of polyepoxysuccinic acid wherein each R and M group is H, and having the molecular formula $HO(C4H2O5H2)_n$, where n ranges from about 2-15. Alternately, the methods hereof can be carried out to produce polymers of the formula

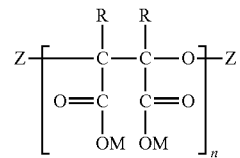

wherein each Z is a repeat unit separately and independently selected from the group consisting of substituted and unsubstituted C1-C12 alkenes or olefins, and mixtures thereof. That is, the Z repeat units may be olefinic hydrocarbons (e.g., vinyl, acrylate, or methacrylate with or without hydrocarbon substituents such as aryl groups), or olefinic hydrocarbons substituted with hetero-atoms (e.g., halides) or hetero-groups (e.g., amine, amide, sulfonate) and acrylamide repeat units, and mixtures thereof. Moreover, as used herein, "olefin" is an inclusive term intended to embrace mono-olefins and poly-olefins (e.g., butadiene).

It will also be understood that salts and other derivatives of the PESA-type polymers of the invention can also be prepared using known techniques. Thus, PESA may be reacted with various salt-forming cations, and particularly the halides, to form the corresponding partial or complete salts. Thus, each R and M may be H to prepare standard PESA, which is then reacted with other members of the R and M group. Alternately, the initial polymerization may be carried out using substituted ESA repeat units. If desired, the resultant polymers can be reacted with any desired terminal group, such as a PO(OH)2 phosphonate group.

A wide variety of free radical catalysts can be employed in the invention, such as those selected from the group consisting of halogens, persulfates, azo compounds, organic peroxides, inorganic peroxides, and mixtures thereof. Particularly preferred catalysts are selected from the group consisting of ammonium persulfate, di-t-butyl peroxide, 2,2'-azobis(2-methylpropionitrile), and iodine, and mixtures thereof.

Generally, the free radical-initiated polymerization reactions of the invention are carried out at elevated temperatures, such as temperatures of from about 40-150° C., more preferably from about 70-120° C. Where aqueous reaction media are used, it is desired that such media have pH levels of from about 5-10, more preferably from about 7-9.

DETAILED DESCRIPTION OF THE PREFERRED EMBODIMENTS

The following examples set forth preferred procedures and reactants useful in carrying out the invention. However, it is to be understood that these examples are provided by way of illustration only, and nothing therein should be taken as a limitation upon the overall scope of the invention.

EXAMPLES

Example 1

Preparation of PESA by Inorganic Free Radical Polymerization

A 500 mL three-neck round bottom flask was charged with 22.3 g maleic anhydride and 32 g water. Next, 29.3 g sodium hydroxide (50% NaOH) was added to the flask over 0.5 hours to form a solid material. The solid was then dissolved by heating to 80° C., followed by cooling to 55° C. with stirring. 32.4 g of 50% hydrogen peroxide was then added to the flask, followed by 0.392 g of sodium tungstate. The reaction mixture was then slowly warmed to about 95° C. until the mixture boiled, creating a clear solution. The solution was then cooled to 60° C. and had a pH of approximately 3. 5.37 g of sodium hydroxide was then added to increase the solution pH to about 6, and the 60° C. temperature level was maintained for 1 hour. 2.29 g of sodium hydroxide was then added to increase the pH of the solution to 8 and to remove excess peroxide. Thereafter, the reaction mixture was heated and refluxed for 0.5 hours, and the pH was then adjusted back to 7 with the addition of 96% sulfuric acid. The resultant ESA was polymerized by adding 0.75 g ammonium persulfate, heating slowly to 100° C., and holding this temperature during 2 hours of reflux. The final PESA product was then cooled to room temperature. The polymer was then tested for calcium sequestration and molecular weight.

Calcium Sequestration—108.

MW peaks 310 and 530 which corresponds to n=2 and 3.

The following reaction scheme illustrates this Example.

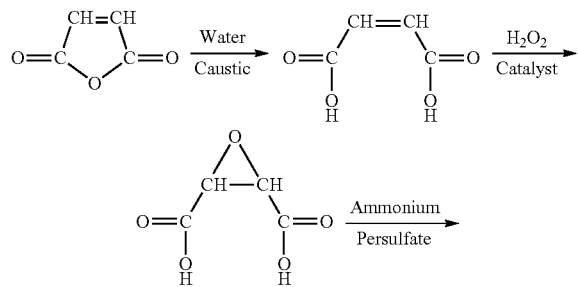

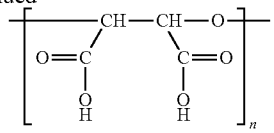

Example 2

Preparation of PESA by Organic Free Radical Polymerization

A 500 mL three-neck round bottom flask was charged with 40.67 g maleic anhydride and 58.36 g water. 37.25 g sodium hydroxide (50% NaOH) was then added over 0.5 hours to form a solid material. The solid was dissolved by heating to 80° C., followed by cooling to 55° C. with stirring. Then, 59.09 g of 50% hydrogen peroxide was added, followed by 0.71 g of sodium tungstate. The reaction mixture was then slowly warmed to 75° C. to boiling, yielding a clear solution. The solution was then cooled to 60° C. (pH about 3). 25.52 g sodium hydroxide was then added to increase the pH to 6. The temperature of the reaction mixture was then held at 60° C. for 1 hour, followed by addition of 3.67 g sodium hydroxide to remove excess peroxide and to elevate the pH to 8. The mixture was then heated and refluxed for 0.5 hours, and 1.11 g 96% sulfuric was added to adjust the pH to 7. The ESA was polymerized by adding 2 g di-t-butyl peroxide, heating the mixture to 80° C. and holding the temperature for 2 hours. The temperature of the reaction mixture was then increased to 100° C., and refluxed at this temperature for 2 hours. The reaction mixture was then cooled to room temperature, and tested for calcium sequestration and molecular weight.

Calcium Sequestration—225

MW peaks—177, 199, 353, 375, 551 which corresponds to n=1, 2 and 3 and 2 or 3 sodium atoms.

The following reaction scheme illustrates this Example.

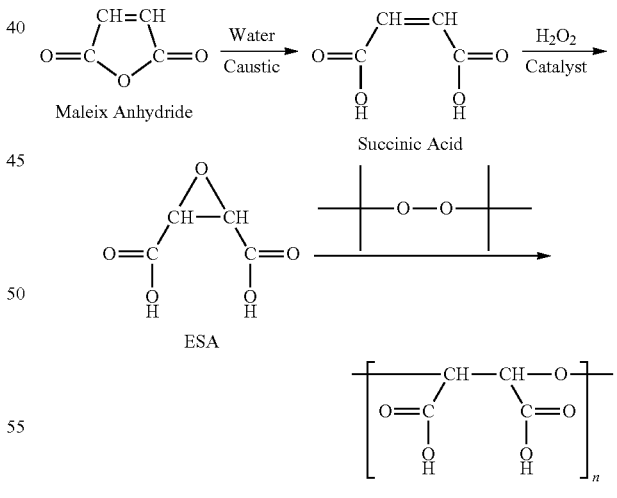

Example 3

Preparation of PESA by Azo Free Radical Polymerization

A 500 mL three-neck round bottom flask was charged with 20.34 g maleic anhydride and 29.18 g water. 18.62 g sodium hydroxide (50% NaOH) was added over 0.5 hours to form a solid material. The solid was dissolved by heating to 80° C., followed by cooling to 55° C. with stirring. 29.55 g of 50% hydrogen peroxide was then added, followed by 0.36 g of sodium tungstate. The reaction mixture was then slowly warmed to a temperature of 75° C. to boiling, yielding a clear solution. The solution was then cooled to 60° C. (pH about 3). 12.76 g sodium hydroxide was added to increase the pH to 6. The mixture was held at 60° C. for 1 hour, followed by addition of 0.47 g sodium hydroxide to increase the pH to 8 and remove excess peroxide. The mixture was then refluxed for 0.5 hours, followed by 0.56 g 96% sulfuric acid to adjust the pH to 7. The ESA was then polymerized by adding 0.38 g AIBN (2,2'-azobis(2-methylpropionitrile)) to the reaction mixture, heating to 80° C. and holding this temperature for 1 hour. Thereupon, the temperature was slowly increased to 100° C., followed by 2 hours of reflux at this temperature. The reaction was then cooled to room temperature, and calcium sequestration and molecular weight were determined.

Calcium Sequestration—126.

MW—981.

The following reaction schemes illustrate this Example.

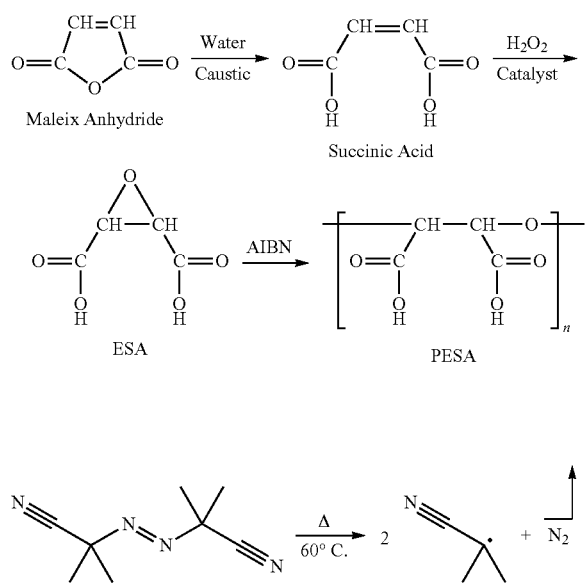

Example 4

Preparation of PESA by Halogen Free Radical Polymerization

A 500 mL three-neck round bottom flask was charged with 20.34 g maleic anhydride and 19.18 g water. 18.62 g sodium hydroxide (50% NaOH) was then added over 0.5 hours to form a solid material. The solid was then dissolved by heated to 80° C., and the mixture was then cooled to 55° C. with stirring. 29.55 g of 50% hydrogen peroxide was next added, followed by 0.36 g of sodium tungstate. The reaction mixture was then slowly warmed to 75° C. to boiling, yielding a clear solution. The solution was then cooled to 60° C. (pH about 3). Then, 12.76 g sodium hydroxide was added to increase the pH to 6, and the mixture was held at this temperature for 1 hour. 0.47 g sodium hydroxide was then added to increase the pH to 8 and to remove excess peroxide. The mixture was then heated and refluxed for 0.5 hours, whereupon the pH was adjusted back to 7 with addition of 0.56 g 96% sulfuric acid. The ESA was polymerized by adding 0.38 g iodine, with heating to 80° C. and holding at this temperature for 2 hours. Then, the temperature was increased to 100° C. and held at this temperature during 2 hours of reflux. The reaction mixture was then cooled to room temperature, and calcium sequestration and molecular weight were determined.

Calcium Sequestration—151

MW—1153

The following reaction scheme illustrates this Example.

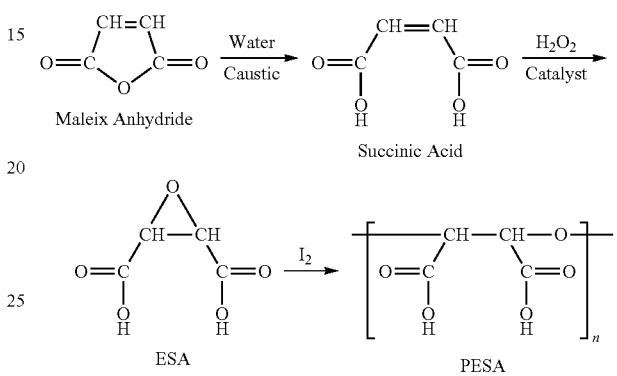

Example 5

Copolymerization of PESA with Methyl Acrylate and Acrylic Acid by Free Radical Polymerization to Yield an Emulsion Polymer A 500 mL three-neck round bottom flask was charged with 22.3 g maleic anhydride and 32 g water. 29.3 g sodium hydroxide (50% NaOH) was then added over 0.5 hours to form a solid material. The solid was dissolved by heating to 80° C., followed by cooling to 55° C. with stirring. 32.4 g of 50% hydrogen peroxide was then added, followed by 0.392 g of sodium tungstate. The reaction mixture was slowly warmed 95° C. to boiling, yielding a clear solution. The solution was then cooled to 60° C. (pH about 3). Next, 5.37 g sodium hydroxide was added to increase the pH to 6, and the reaction mixture was held at 60° C. for 1 hour. 2.29 g sodium hydroxide was then added to increase the pH to 8 and to remove excess peroxide, followed by heating and refluxing for 0.5 hours. 1.29 g acrylic acid was then added to adjust the pH to 7, followed by the addition of 4.57 g methyl acrylate and 0.75 g ammonium persulfate. The reaction was then slowly heat to 100° C., and held at this temperature for 1 hour. The reaction mixture was then cooled to room temperature, giving an emulsion polymer.

The following reaction scheme illustrates this Example.

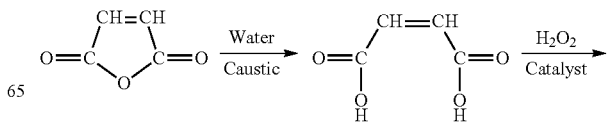

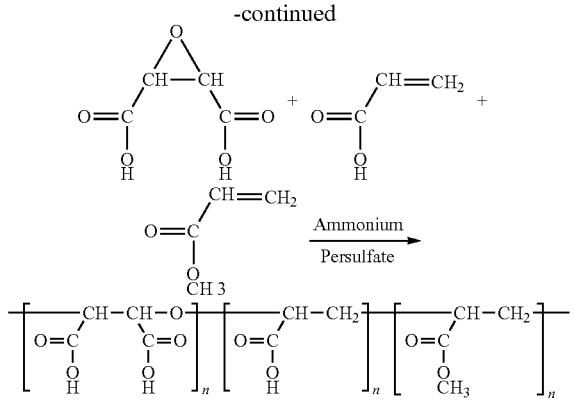

Example 6

Copolymerization of PESA with Acrylic Acid by Free Radical Mechanism

A 500 mL three-neck round bottom flask was charged with 22.3 g maleic anhydride and 32 g water. 29.3 g sodium hydroxide (50% NaOH) was then added over 0.5 hours to form a solid material. The solid was dissolved by heating to 80° C., followed by cooling to 55° C. with stirring. 32.4 g of 50% hydrogen peroxide was then added, followed by 0.392 g of sodium tungstate. The reaction mixture was slowly warmned 95° C. to boiling, yielding a clear solution. The solution was then cooled to 60° C. and held at this temperature for 1 hour. Next, 6.32 g sodium hydroxide was added to increase the pH to over 8 and to remove excess peroxide. The mixture was then heated and refluxed over 0.5 hours, followed by the addition of 2.32 g acrylic acid to adjust the pH to 7. The ESA/Acrylic acid mixture was then polymerized by adding 0.75 g ammonium persulfate, slowly heating to 100° C., and holding this temperature for 2 hours with reflux. The reaction mixture was then cooled to room temperature and the calcium sequestration value was determined.

Calcium Sequestration—92.5.

The following reaction scheme illustrates this Example.

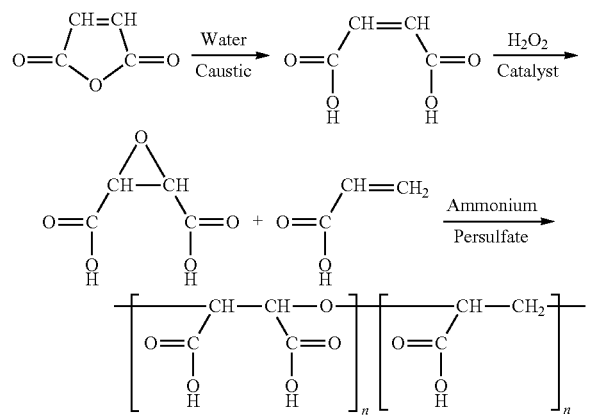

Example 7

Copolymerization of Acrylic Acid and Phosphorous Acid by Free Radical Polymerization A 500 mL three-neck round bottom flask was charged with 35 g of 70% phosphorous acid and 50 g water. A first addition funnel was filled with 103.99 g water and 20 g ammonium persulfate, and a second addition funnel was filled with 120 g acrylic acid. The water/phosphorous acid mixture in the flask was heated to 90° C. and the water/ammonium persulfate mixture in the first addition funnel was slowly added dropwise over 2.5 hours. Five minutes after the start of the ammonium persulfate addition, the addition of the acrylic acid from the second addition funnel was started, and continued dropwise over 2 hours. After these additions were completed, the mixture was held for 3 hours at 90° C. Thereupon, the solution was cooled and the pH was adjusted to 3.5 by addition of 52.66 g of sodium hydroxide, and calcium sequestration and molecular weight were determined.

Calcium Sequestration—425.

MW—15500.

The following reaction scheme illustrates this Example.

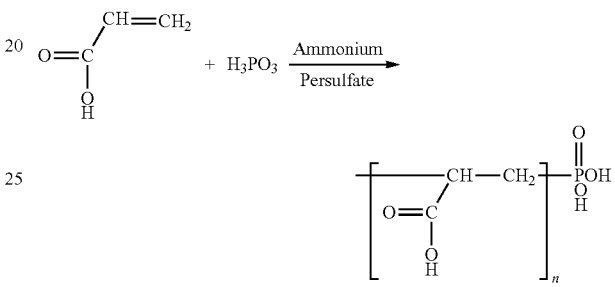

Example 8

Copolymerization of PESA with Acrylic Acid and Phosphorous Acid by Free Radical Polymerization A first 500 mL three-neck round bottom flask was charged with 40.67 g maleic anhydride and 58.36 g water. 37.25 g sodium hydroxide was then added over 0.5 hours, and the reaction mixture was heated to 80° C. to dissolve all of the materials. The temperature was then lowered to 55° C., and 59.09 g of 50% peroxide was added, followed by 0.71 g sodium tungstate. Two reflux condensers were placed on the flask, and the reaction mixture was slowly warmed to about 80° C. to boiling. The reaction mixture was then cooled to 60° C. (pH about 3), and then 25.52 g, of sodium hydroxide was then added to increase the pH to 6, and the reaction was held at 60° C. for 1 hour. 3.67 g sodium hydroxide was then added to increase the pH to over 8 and to remove excess peroxide. The reaction was then heated and refluxed for 0.5 hours, followed by cooling of the mixture to room temperature and addition of 1.11 g sulfuric acid to adjust pH to about 7.

A second 500 mL three-neck round bottom flask was charged with 50 g of water and 35 g of 70% phosphorous acid, and fitted with three reaction funnels. 20 g of ammonium persulfate and 113.76 g of water were placed in the first funnel, and 89.71 g of acrylic acid was placed in the second funnel. The ESA reaction product from the first flask was placed in the third funnel. The phosphorous acid/water solution in the first funnel was warmed to 90° C., and addition of the ammonium persulfate solution in the second funnel was begun for a 2.5 hours period. The ESA solution in the third funnel was started 5 minutes after commencement of the ammonium persulfate solution addition, over a period of 1.5 hours. Addition of the acrylic acid in the second funnel was started 5 minutes after the beginning of the ESA solution over a period of 2 hours. After all of the additions were complete, the reaction was held at 90° C. for 3 hours. The reaction mixture was then cooled and adjusted to 3.5 pH by addition of 13.61 g sodium hydroxide, and calcium sequestration and molecular weight were determined.

Calcium Sequestration—250.
MW—6040.

The following reaction scheme illustrates this Example.

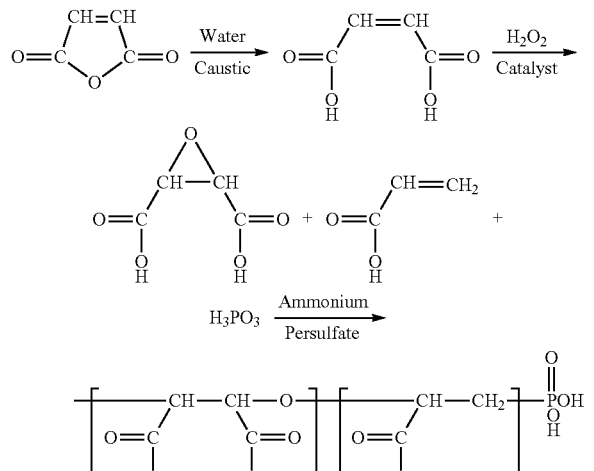

Example 9

Copolymerization of PESA with DMAEMA and AMPS by Free Radical Polymerization

A 500 mL three-neck round bottom flask was charged with 22.3 g maleic anhydride and 32 g water, followed by the addition of 29.3 g sodium hydroxide (50% NaOH) over 0.5 hours to form a solid material. The solid was dissolved by heating to 80° C., followed by cooling to 55° C. with stirring, and the addition of 32.4 g of 50% hydrogen peroxide and 0.392 g of sodium tungstate. The reaction mixture was then slowly warmed to 95° C. to almost boiling, yielding a clear solution. The solution is cooled to 60° C. and held at this temperature for 1 hour. 30.94 g of N,N-dimethylaminoethyl methacrylate (DMAEMA) and 16.62 g sodium hydroxide were then added to increase the pH to over 8 and remove excess peroxide, followed by heating and refluxing for 0.5 hrs. The pH was adjusted back to pH 7 with the addition of 15 g 2-acrylamido-2-methylpropane sulfonic acid (AMPS). The ESA/DMAEMA/AMPS mixture was polymerized by the addition of 0.75 g ammonium persulfate, followed by slowly heating the mixture to 100° C., and holding at this temperature for 2 hours with refluxing. The reaction mixture was then cooled to room temperature, and calcium sequestration and molecular weight were determined.

Calcium Sequestration—137.5.
MW—3800.

The following reaction scheme illustrates this Example.

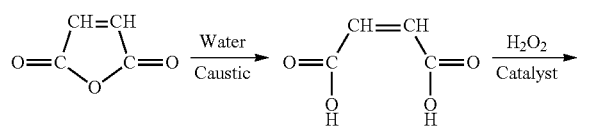

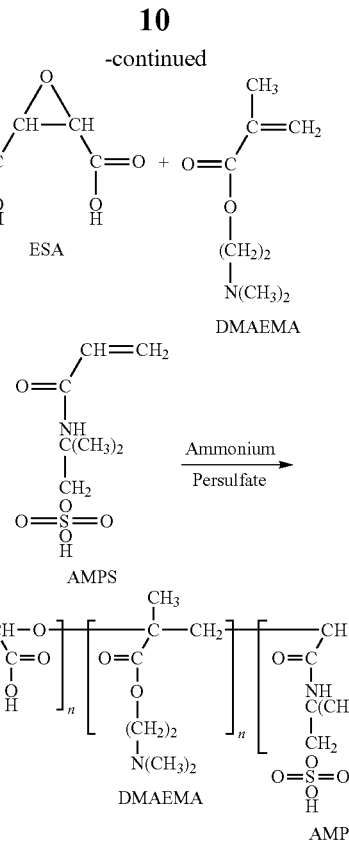

Example 10

ESA Reacted with Diethylenetriamine (DETA), Followed by Phosphonation

A first 500 mL three-neck round bottom flask was charged with 51.65 g of DETA and 32 g of water, followed by the very slow addition of 22.3 g maleic anhydride and 32 g water. The water was then distilled from the reaction mixture to create a solid product. The solid product was heated to a level of 140 to 160° C. for 2 hours, followed by cooling and the addition of 64 g distilled water. This amine reaction product was then transferred to an addition funnel.

A second 500 mL three-neck round bottom flask was charged with 159.94 g 70% phosphorous acid, 110.81 g 37% formaldehyde, and 80.27 g 31% HCl. The reaction temperature was raised to 80° C. and the amine reaction product was ten added over a period of 1.5 hours, while keeping the temperature at 80° C. This reaction was held maintained for 15 minutes, followed by distillation of 31.10 g water, and the calcium sequestration and molecular weight were determined.

Calcium Sequestration—344
Molecular Weight—2355

The following reaction scheme illustrates this Example.

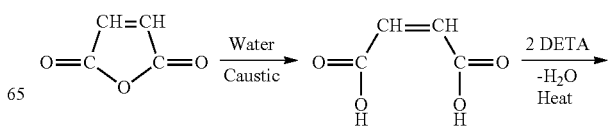

-continued

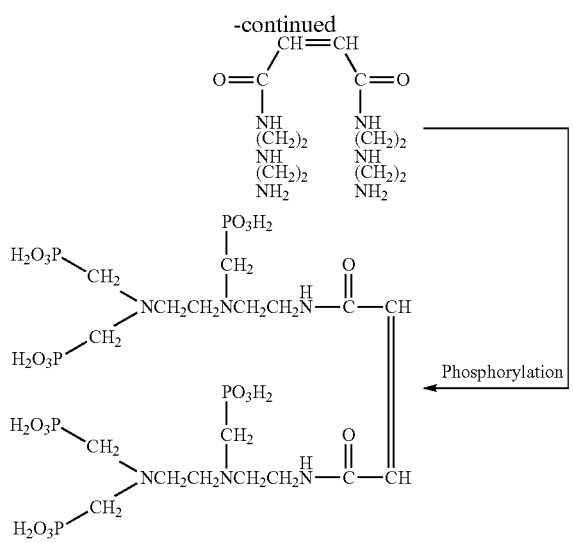

Example 11

ESA Reacted with Diethylenetriamine (DETA), Followed by Polymerization with Acrylic Acid and Phosphonation A first 500 mL three-neck round bottom flask was charged with 51.65 g of DETA and 32 g of water, followed by the very slow addition of 22.3 g maleic anhydride and 32 g water. The water was then distilled giving a solid product. The solid product was then heated to 140 to 160° C. for 2 hours, and then cooled with the addition of 64 g distilled water. The reaction mixture was further cooled and 16.40 g of acrylic acid was added, followed by the addition of 17.48 g of 30% HCl to adjust the pH to about 7. Polymerization was effected by the addition of 6.75 g of ammonium persulfate, with heating to 80° C. for 2 hours, followed by refluxing for 0.5 hours. The amine solution was cooled and placed in an addition funnel.

A second 500 mL three-neck round bottom flask was charged with 159.94 g 70% phosphorous acid, 110.81 g 37% formaldehyde, and 62.82 g 31% HCl. The mixture was then heated to 80° C. The amine product from the addition funnel was added over 1.5 hours, keeping the temperature at 80° C. The reaction was then held for 15 minutes and 132.38 g water was then distilled from the product, and calcium sequestration and molecular weight were determined.

Calcium Sequestration—425

Molecular Weight—1813 (n=2)

The following reaction scheme illustrates this Example.

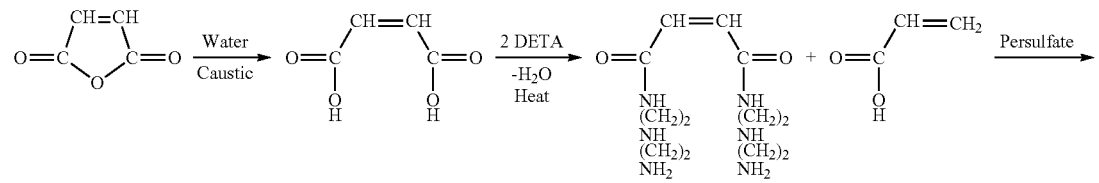

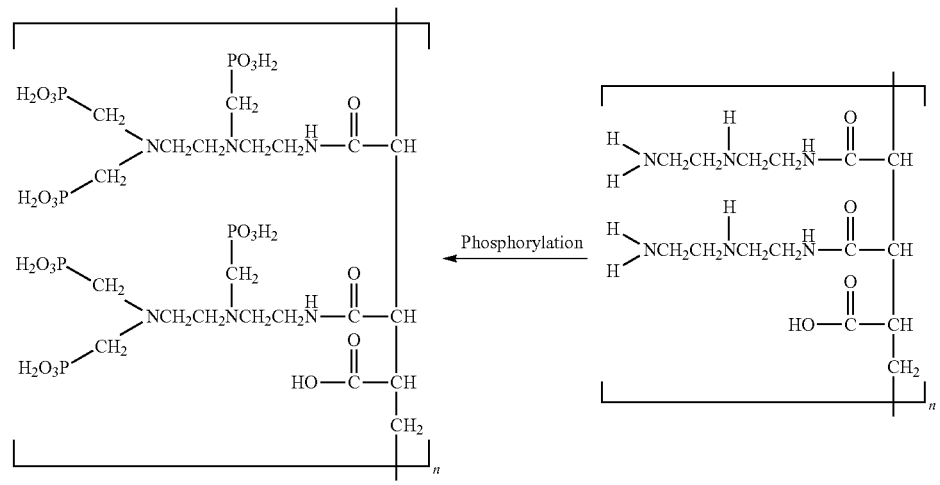

The calcium sequestration tests involved adding 1 g of the sample product in a 250 mL glass beaker, followed by the addition of 100 mL water. The pH was then adjusted to 8 with 50% NaOH. Next, 10 mL 2% sodium carbonate solution was added to the beaker, followed by adjustment of the pH to 11 with 50% NaOH. The sample was then titrated using 0.25 N calcium acetate solution. Titration was deemed complete when the solution exhibited a haze persisting for 1 minute. The final calculation represented the calcium carbonate required per gram of sample product to complete the titration=25×mL calcium acetate/weight of sample product in grams. The higher the calcium sequestration value, the better the sample product is at preventing scaling of calcium carbonate.

Results

As seen in the foregoing examples, ESA polymerization has been achieved using four classes of free radical initiators (inorganic, organic, azo and halogen), with the complete elimination of calcium ion and the consequent need to separate calcium from the final product. Moreover, the examples confirm that the polymerization can take place in water, with water soluble solvents, or as emulsions. Olefin repeat units (e.g., acrylates, acrylamides, vinyls, and the like) can also be copolymerized with ESA. The carboxylic acid functionality of PESA, or the PESA monomers, allows for derivatization to form esters, amides, etc. Derivatized monomeric materials can then be polymerized or used as is. Moreover, the addition of an unsaturated monomer and phosphorous acid will result in a phosphorus telomere.

We claim:

1. A method of synthesizing a polymer including repeat units of the formula

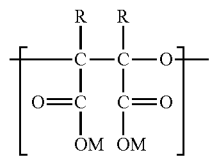

comprising the step of polymerizing repeat unit precursors of the formula

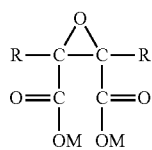

in the presence of a free radical catalyst, where each R and each M is separately and independently selected from the group consisting of H, C1-C12 straight or branched chain alkyl, aryl, amine, amide, and ester groups, halides, and mixtures thereof.

2. The method of claim 1, said polymer being polyepoxysuccinic acid wherein each R and M group is H, and having the molecular formula HO(C4H2O5H2)n, where n ranges from about 2-15.

3. The method of claim 1, said polymer being of the formula

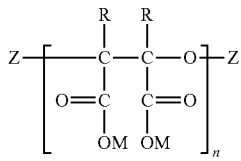

wherein each Z is a repeat unit separately and independently selected from the group consisting of substituted and unsubstituted C1-C12 olefins, and mixtures thereof, where n ranges from about 2-15.

4. The method of claim 3, said Z repeat units being different.

5. The method of claim 3, said Z repeat units selected from the group consisting of vinyl, acrylate, methacrylate, and acrylamide repeat units, and mixtures thereof.

6. The method of claim 1, said polymer having at least one terminal PO(OH)2 phosphonate group.

7. The method of claim 1, said free radical catalyst selected from the group consisting of halogens, persulfates, azo compounds, organic peroxides, inorganic peroxides, and mixtures thereof.

8. The method of claim 7, said catalyst selected from the group consisting of ammonium persulfate, di-t-butyl peroxide, 2,2'-azobis(2-methylpropionitrile), and iodine, and mixtures thereof.

9. The method of claim 1, including the step of carrying out said polymerization at a temperature of from about 40-150° C.

10. The method of claim 1, said repeat units being in aqueous dispersion having a pH of from about 5-10.

11. The method of claim 1, including the step of phosphonating said polymer after said polymerization reaction.

* * * * *